US008690267B2

(12) United States Patent  
Jiang et al.

(10) Patent No.: US 8,690,267 B2
(45) Date of Patent: Apr. 8, 2014

(54) ASSEMBLY UNIT AND CASING HAVING THE SAME

(75) Inventors: Yue-Wen Jiang, Taoyuan County (TW); Shu-Hua Mau, Taoyuan County (TW)

(73) Assignees: Lite-On Electronics (Guangzhou) Limited, Guangzhou (CN); Lite-On Technology Corporation, Taipei (TW)

(*) Notice: Subject to any disclaimer, the term of this patent is extended or adjusted under 35 U.S.C. 154(b) by 153 days.

(21) Appl. No.: 13/228,620

(22) Filed: Sep. 9, 2011

(65) Prior Publication Data

US 2012/0169198 A1 Jul. 5, 2012

(30) Foreign Application Priority Data

Dec. 31, 2010 (CN) .......................... 2010 1 0623332

(51) Int. Cl.
| A47B 81/00 | (2006.01) |
| A47B 97/00 | (2006.01) |
| G06F 1/16 | (2006.01) |
| H05K 5/00 | (2006.01) |
| H05K 7/00 | (2006.01) |

(52) U.S. Cl.
USPC .................................. 312/223.2; 361/679.33

(58) Field of Classification Search
USPC .................. 312/223.1, 223.2, 265.6; 211/26; 361/727, 679.31, 679.33, 679.35, 361/679.36, 679.37, 679.38
See application file for complete search history.

(56) References Cited

U.S. PATENT DOCUMENTS

| 4,979,909 | A | * | 12/1990 | Andrews ....................... 439/352 |
| 5,262,923 | A | * | 11/1993 | Batta et al. ............... 361/679.37 |
| 6,464,085 | B1 | * | 10/2002 | Chin et al. ..................... 211/26 |
| 6,646,871 | B1 | * | 11/2003 | Liao et al. ................ 361/679.36 |
| 6,654,240 | B1 | * | 11/2003 | Tseng et al. ............. 361/679.33 |
| 6,771,496 | B1 | * | 8/2004 | Wu ........................... 361/679.58 |
| 6,853,549 | B2 | * | 2/2005 | Xu ............................ 361/679.39 |
| 6,882,526 | B2 | * | 4/2005 | Neukam et al. .......... 361/679.39 |
| 7,295,432 | B2 | * | 11/2007 | Xu ............................ 361/679.33 |
| 7,327,565 | B2 | * | 2/2008 | Chen et al. ............... 361/679.33 |
| 7,336,482 | B2 | * | 2/2008 | Chen et al. ............... 361/679.33 |
| 7,408,770 | B2 | * | 8/2008 | Peng et al. ............... 361/679.33 |
| 7,428,147 | B2 | * | 9/2008 | Lin ........................... 361/679.33 |
| 7,440,270 | B2 | * | 10/2008 | Zheng et al. .............. 361/679.33 |
| 7,450,375 | B2 | * | 11/2008 | Xu ............................ 361/679.33 |
| 7,542,277 | B2 | * | 6/2009 | Chen et al. ............... 361/679.31 |
| 7,542,281 | B2 | * | 6/2009 | Liang et al. .............. 361/679.39 |
| 7,950,752 | B2 | * | 5/2011 | Lin ................................. 312/333 |
| 8,191,842 | B2 | * | 6/2012 | Tsai ............................ 248/222.12 |
| 2005/0078445 | A1 | * | 4/2005 | Chen et al. ..................... 361/685 |
| 2006/0231686 | A1 | * | 10/2006 | Lin ............................... 248/27.1 |

* cited by examiner

Primary Examiner — Darnell Jayne
Assistant Examiner — Kimberley S Wright
(74) Attorney, Agent, or Firm — Li & Cai Intellectual Property (USA) Office

(57) ABSTRACT

A an assembly unit for assembling a drawable device into a casing includes a fixing member disposed on a side wall of the drawable device and a latching member slidably disposed on the casing correspondingly to the fixing member. The fixing member has a fixing hole thereon. The casing has a first tongue portion corresponding to the latching member and a fixing protrusion protruding toward the interior of the casing; wherein the fixing protrusion engages with the fixing hole when the drawable device is assembled into the casing.

12 Claims, 14 Drawing Sheets

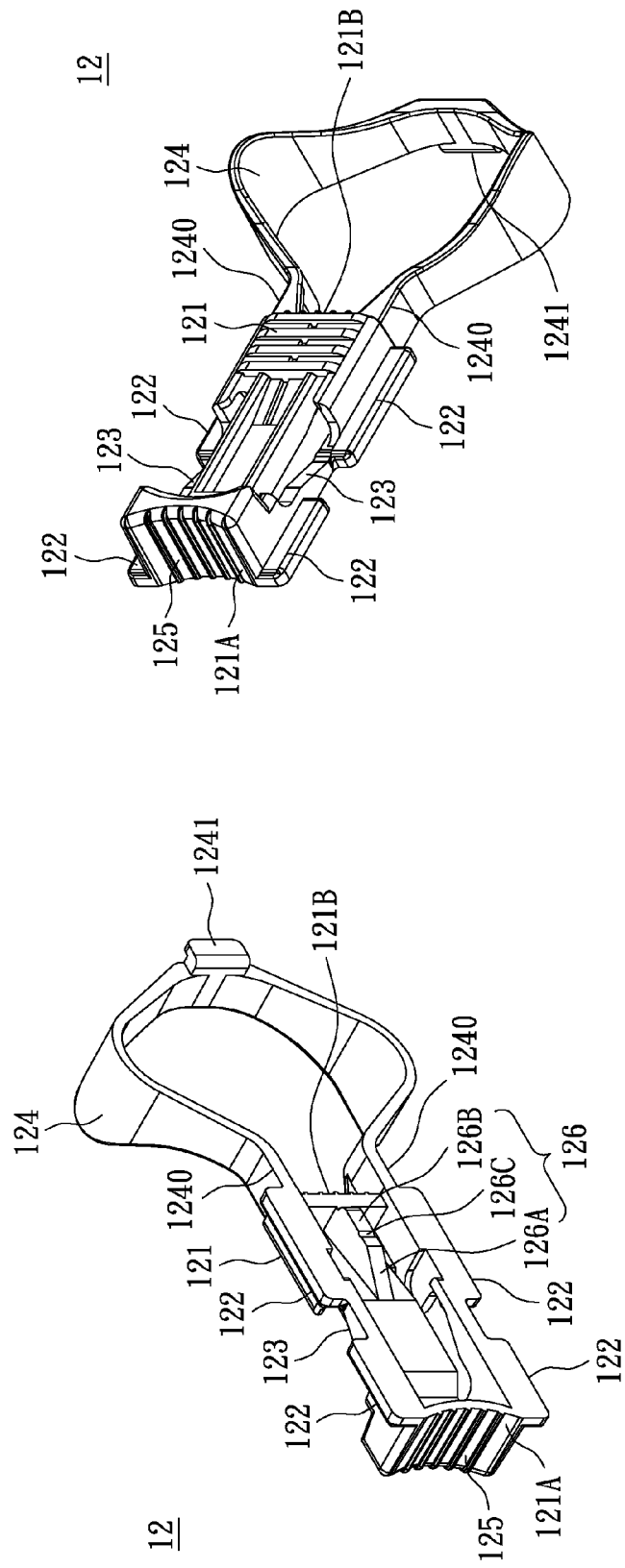

ASSEMBLY UNIT AND CASING HAVING THE SAME

BACKGROUND OF THE INVENTION

1. Field of the Invention

The present invention relates to an assembly unit and a casing having the same. In particular, the present invention relates to a screw-less assembly unit and a casing having the same.

2. Description of Related Art

With the development of the technology, an electronic apparatus, such as a personal computer has higher efficiency. Therefore, a user can execute programs to process data by CPU of the personal computer for getting information.

In general, the electronic apparatus includes a casing and electronic units or devices received inside the casing, such as main board, CPU, RAM module, sound card, display card and storage devices. The storage devices can be classified into floppy disks, hard disks, optical disk drivers, rewritable optical disk drivers and electronic card readers. Traditionally, the storage devices are pushed in the frame inside the casing and then they are fixed in the frame inside the casing by tools and screws.

However, it is not convenient for users to fix the storage devices by tools and screws. For example, it costs time to assemble the storage devices by screws. Furthermore, the screws are easily lost and would result in the instability of the casing.

SUMMARY OF THE INVENTION

The instant disclosure provides an assembly unit for mounting a drawable device into a casing in a tool-less and screw-less manner.

The instant disclosure provides an assembly unit for assembling a drawable device to a casing, the assembling unit comprising: a fixing member disposed on a side wall of the drawable device and having a fixing hole; a latching member slidably disposed on the casing and corresponding to the fixing member; wherein the casing has a first tongue portion corresponding to the latching member and a fixing protrusion protruding toward the interior of the casing; and wherein the fixing protrusion engages with the fixing hole when the drawable device is assembled to the casing.

The instant disclosure provides a casing for assembling a drawable device, the drawable device being inserted into the casing, the casing comprising a plurality of plates and an assembly unit; wherein the assembly unit comprises: a fixing member disposed on a side wall of the drawable device and having a fixing hole thereon; a latching member slidably disposed on one of the plates corresponding to the fixing member; wherein said one of the plates has a first tongue portion corresponding to the latching member and a fixing protrusion protruding toward the interior of the casing; and wherein the fixing protrusion engages with the fixing hole when the drawable device is assembled to the casing.

The instant disclosure provides a casing for assembling a device, the device being inserted into the casing, the casing comprising a plurality of plates and a fixing member disposed on a side wall of the device and having a fixing hole thereon; wherein one of the plates has a first tongue portion and a fixing protrusion protruding toward the interior of the casing; and wherein the fixing protrusion engages with the fixing hole when the device is assembled to the casing.

The movement of the latching member is provided for lifting the free end of the first tongue portion and thus for disengaging the fixing protrusion with the fixing hole of the fixing member so that one can draw the drawable device out of the casing. On the contrary, when the drawable device is inserted into the casing, the fixing protrusion formed on the first tongue portion engages with the fixing hole of the fixing member disposed on the drawable device. Hence, the drawable device can be fixedly secured in the casing. Accordingly, the assembly unit of the present invention is provided for securing the drawable device in a screw-less and tool-less manner.

For further understanding of the present invention, reference is made to the following detailed description illustrating the embodiments and examples of the present invention. The description is for illustrative purpose only and is not intended to limit the scope of the claim.

BRIEF DESCRIPTION OF THE DRAWINGS

FIG. 3 shows the perspective view of the latching member of the assembly unit of the instant disclosure.

FIG. 3A shows another perspective view of the latching member of the assembly unit of the instant disclosure.

DETAILED DESCRIPTION OF THE PREFERRED EMBODIMENTS

Figure 1:
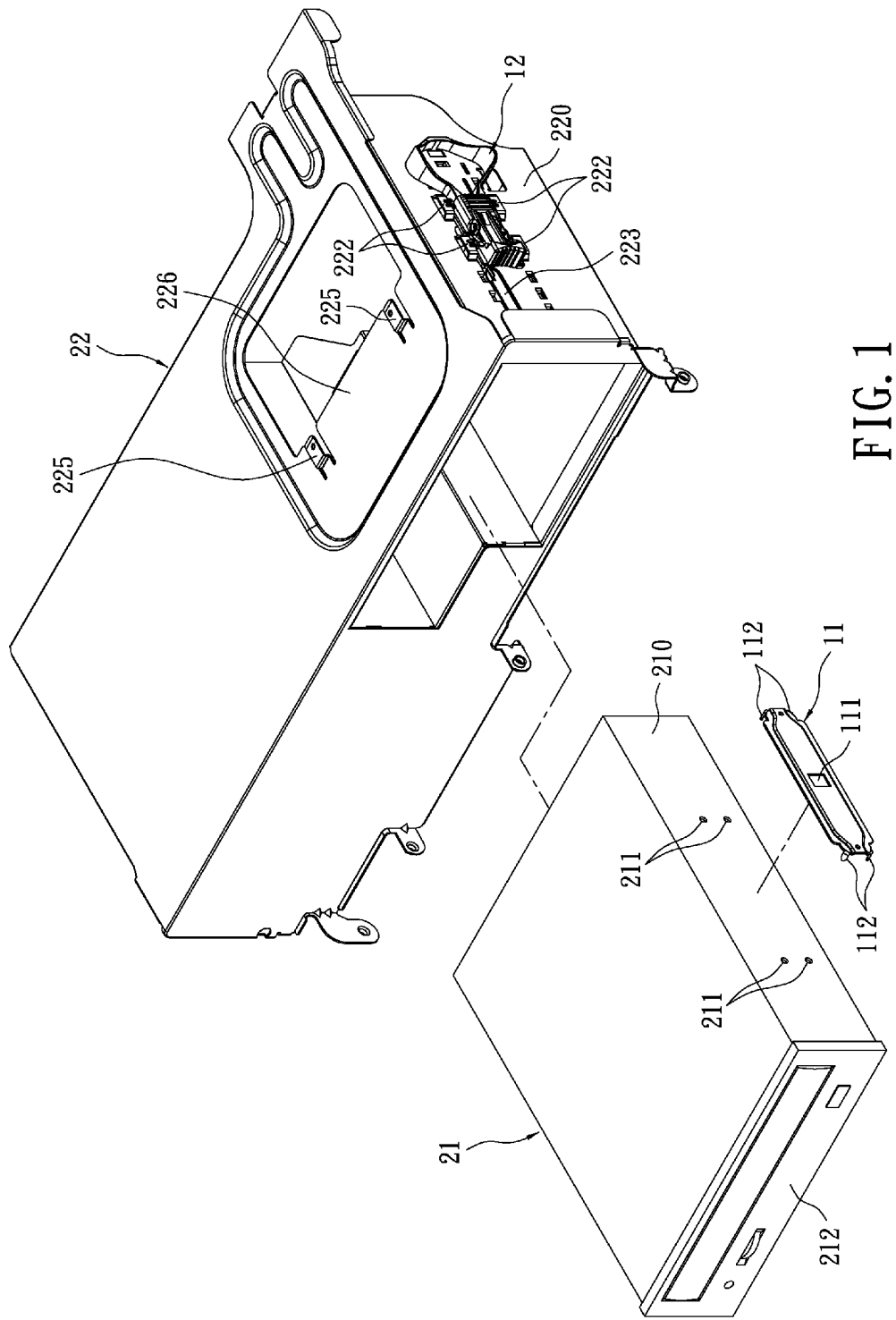
FIG. 1 is an exploded view showing the assembly unit of the instant disclosure for assembling the optical disk driver in the casing of a computer.
Figure 1A:
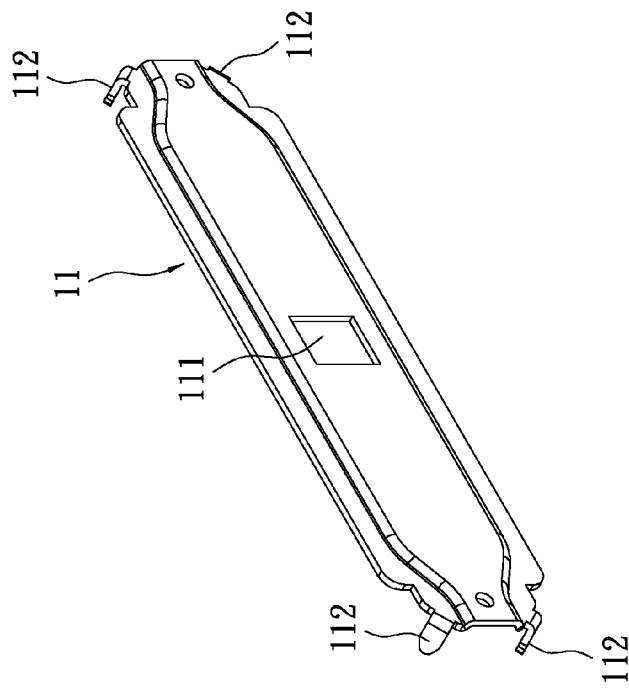
FIG. 1A shows the perspective view of the fixing member of the assembly unit of the instant disclosure.
Figure 1B:
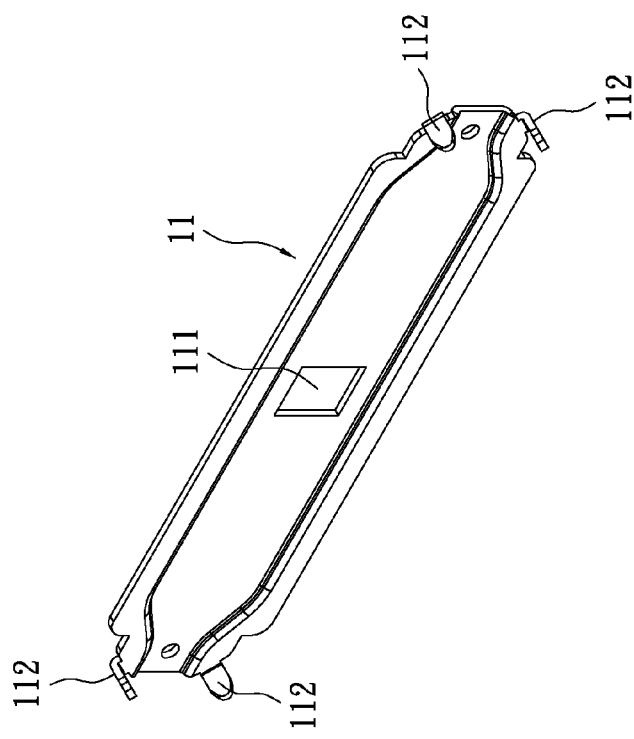
FIG. 1B shows another perspective view of the fixing member of the assembly unit of the instant disclosure.

The present invention provides an assembly unit for mounting a drawable device into a casing. By the assembly unit, one can secure or unsecure the drawable device onto the casing without screws. Furthermore, the assembly unit will not widely enlarge the width of the drawable device so that the assembly unit can be applied in casings of traditional size with no need of special specifications. Please note that the drawable device may be any disk driver, such as an optical disk driver, a hard disk driver, a floppy disk driver or an electronic card reader, or any drawable tray. The casing may be a computer casing, a chassis of a server or a casing of any other apparatus, but not restricted thereby. Hereinafter, the assembly unit of the exemplary embodiment is applied for mounting an optical disk driver into a computer casing. In addition, the direction hereinafter is referenced to the direction of the optical disk driver 21, as illustrated in FIG. 1, inserted into the computer casing 22. For example, the direction to which the operation panel 212 of the optical disk driver 21 faces can be referred as the front, and the opposite direction can be referred as the rear.

Figure 1C:
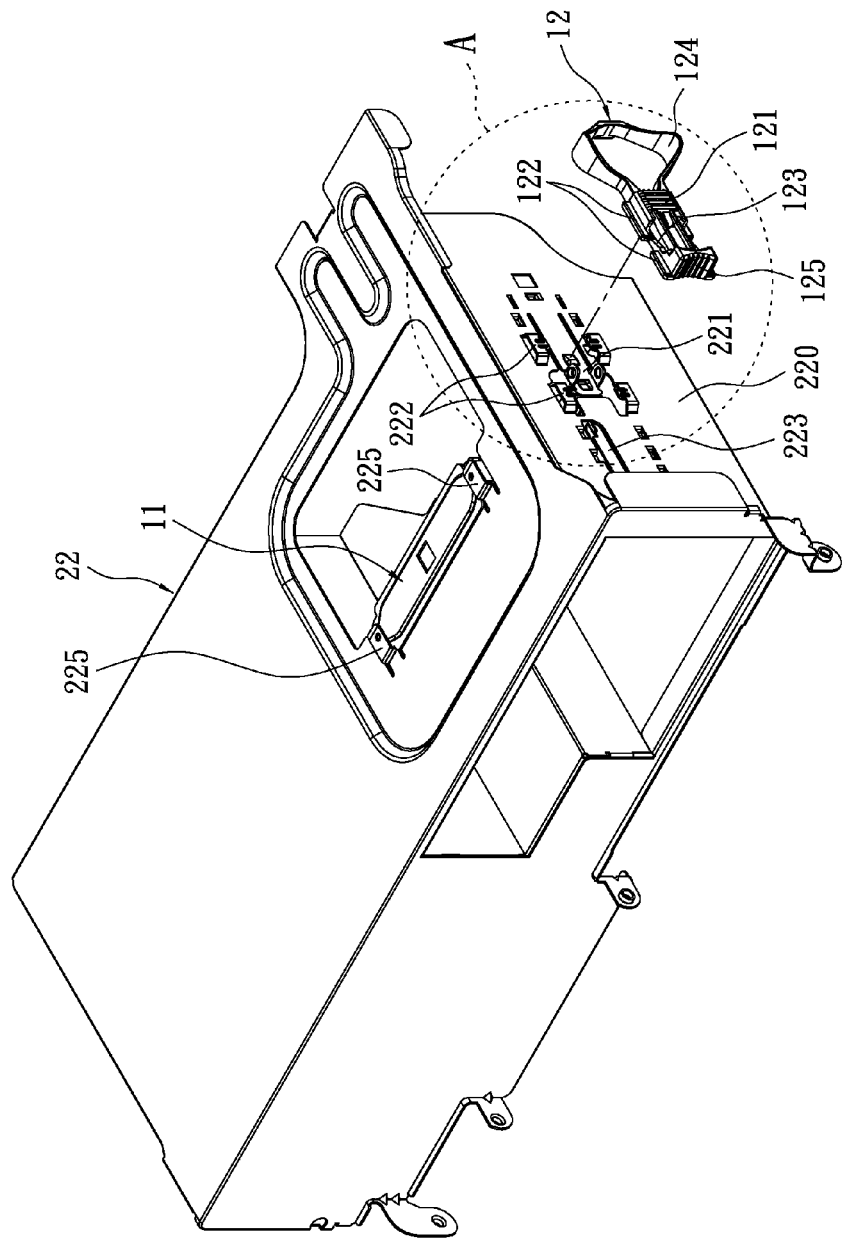
FIG. 1C shows that the latching member of the assembly unit is disposed on the casing and the fixing member is disposed on the storage portion of the casing.
Figure 1D:
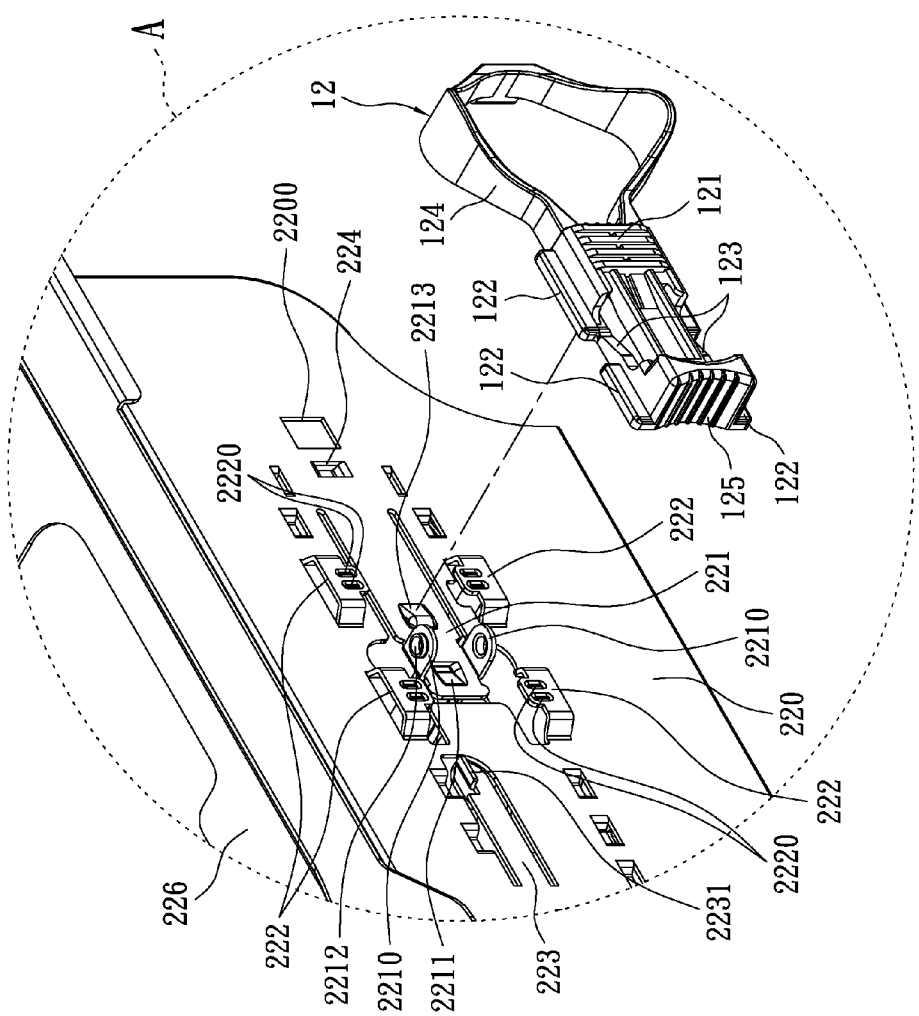
FIG. 1D shows the enlarged view of A part of FIG. 1C.

Please refer to FIGS. 1 through 1D; the assembly unit of the instant disclosure comprises a fixing member 11 and a latching member 12. The computer casing 22 may be constructed by a plurality of plates, such as a side plate 220 and a top plate 226, and a first tongue portion 221 and a second tongue portion 223 are formed on the side plate 220. The latching member 12 is disposed on the side plate 220 corresponding to the first tongue portion 221. The fixing member 11 is disposed on the optical disk driver 21. In the exemplary embodiment, the fixing member 11 is disposed on the side wall 210 of the optical disk driver 21. The fixing member 11 and the latching member 12 correspond to each other so that the optical disk driver 21 can be assembled onto or disassembled from the computer casing 22 by using the fixing member 11 and the latching member 12. The latching member 12 can slide relatively to the computer casing 22 to release the optical disk driver 21 and then one can draw the optical disk driver 21 away from the computer casing 22. In the exemplary embodiment, only one fixing member 11 and one latching member 12 are used to secure the optical disk driver 21 in one-side fixing manner, but not restricted thereby. The quantities and assembling positions of the fixing member 11 and the latching member 12 can be adjusted based on applications.

As shown in FIGS. 1, 1C and 1D, the optical disk driver 21 has one fixing member 11 on the side wall 210 thereof and the fixing member 11 has a fixing hole 111 thereon. The side plate 220 has a first tongue portion 221 corresponding to the latching member 12 and an abutting protrusion 224, as illustrated in FIG. 2C. In the exemplary embodiment, the abutting protrusion 224 protrudes from the inner surface of the side plate 220 of the casing 22 toward the interior of the casing 22. The first tongue portion 221 has a fixing protrusion 2211 thereon. In detail, the fixing protrusion 2211 is formed substantially near to the free end of the first tongue portion 221 and protrudes toward the interior of the casing 22. When the optical disk driver 21 is inserted into the casing 22, as shown in FIGS. 2B and 2C in which the optical disk driver 21 is not displayed for concision, the fixing protrusion 2211 is engaged with the fixing hole 111 of the fixing member 11 so that the optical disk driver 21 can't be drawn forward. In addition, one end (i.e., the rear end) of the fixing member 11 abuts against the abutting protrusion 224 so that the optical disk driver 21 can't be pushed backward. Hence, the optical disk driver 21 is fixedly secured on the side plate 220 of the casing 22.

On the other hand, the threaded holes of the common optical disk driver 21 are used as the assembling holes 211 for mounting the fixing member 11 on the optical disk driver 21. In the exemplary embodiment, the optical disk driver 21 has four threaded holes, as shown in FIG. 1, and the fixing member 11 has assembling pillars 112 corresponding to the assembling holes 211. Therefore, one can insert the assembling pillars 112 to the corresponding assembling holes 211 for mounting the fixing member 11 onto the side wall 210 of the optical disk driver 21, but not restricted thereby. Accordingly, the fixing member 11 is detachably disposed onto the side wall 210 of the optical disk driver 21. One can fix the fixing member 11 onto the desired drawable device such as the optical disk driver 21 for securing it onto the casing 22. Alternatively, one can secure the drawable device onto the casing 22 by screws and the threaded holes. As the foregoing statement, the drawable device can be fixedly secured onto the casing 22 only by the fixing member 11 (i.e., without the latching member 12) when the function of drawing away the drawable device is not necessary.

Figure 2:
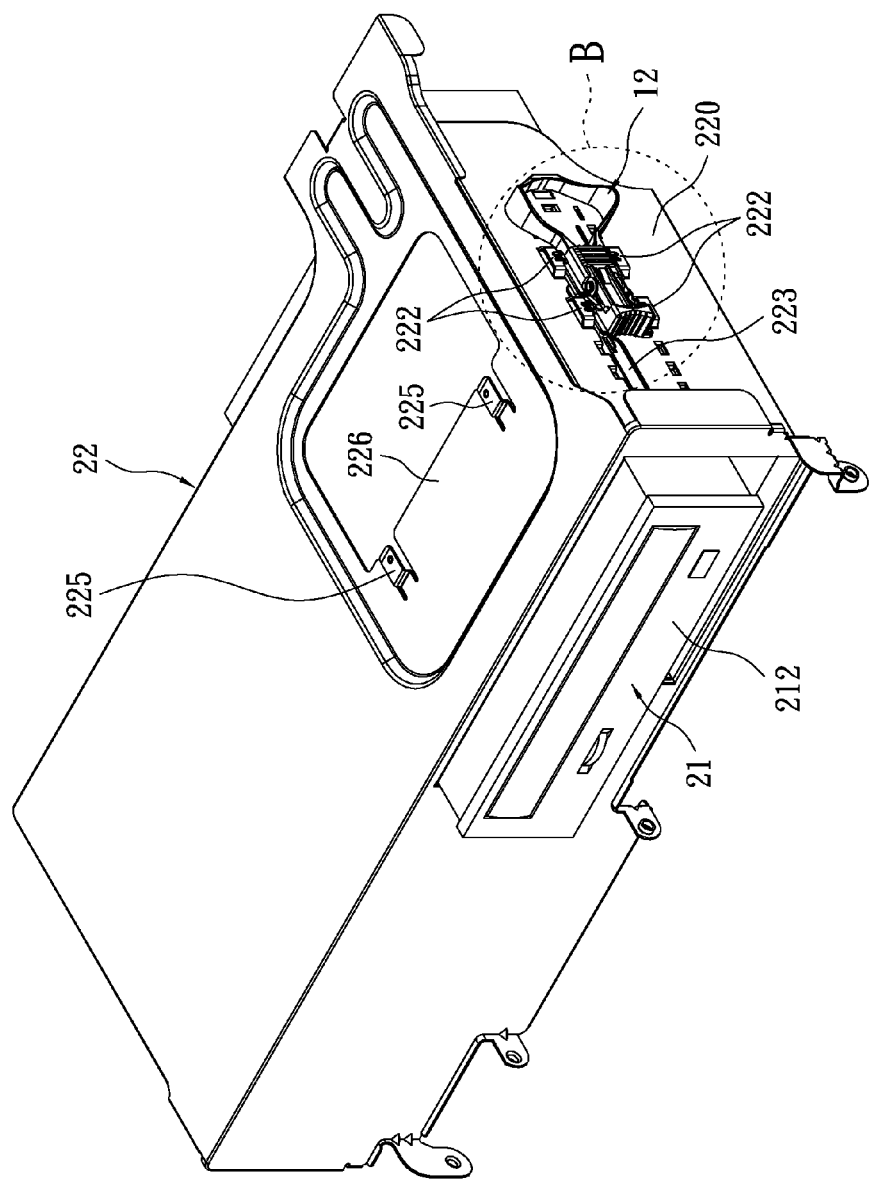
FIG. 2 is a perspective view showing that by the assembly unit of the instant disclosure the optical disk driver is securely assembled in the casing.
Figure 2A:
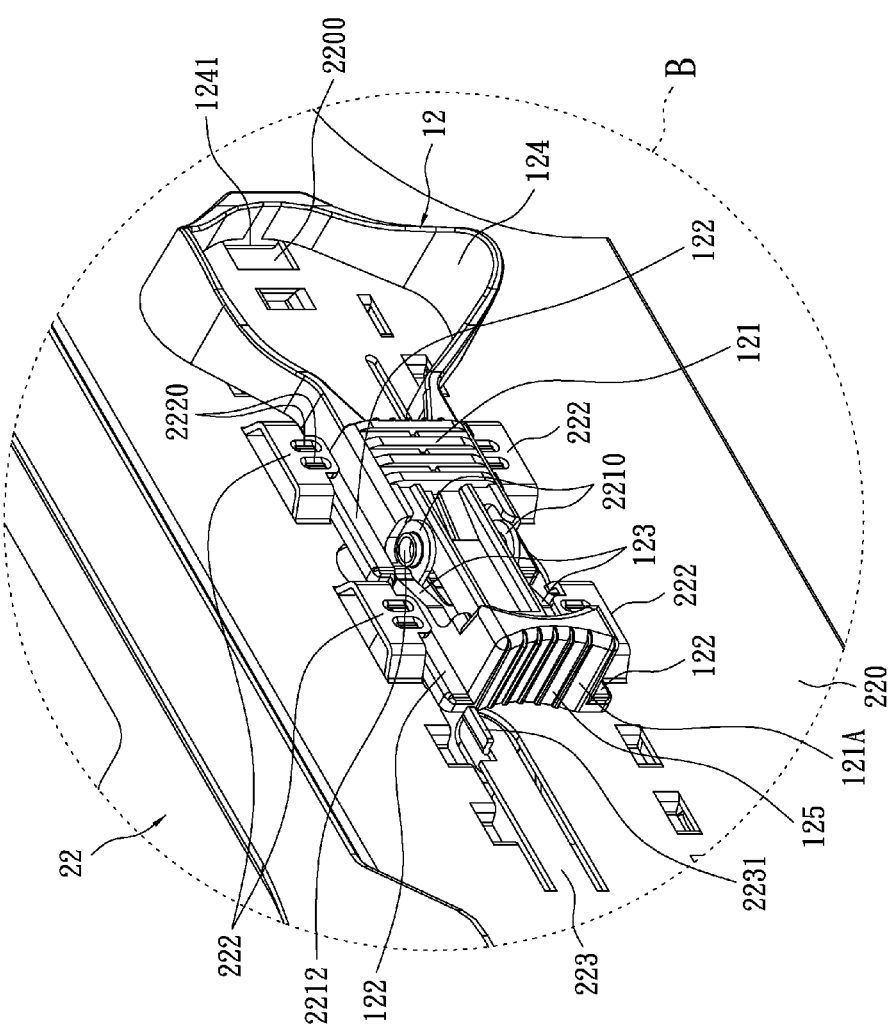
FIG. 2A shows the enlarged view of B part of FIG. 2.
Figure 2B:
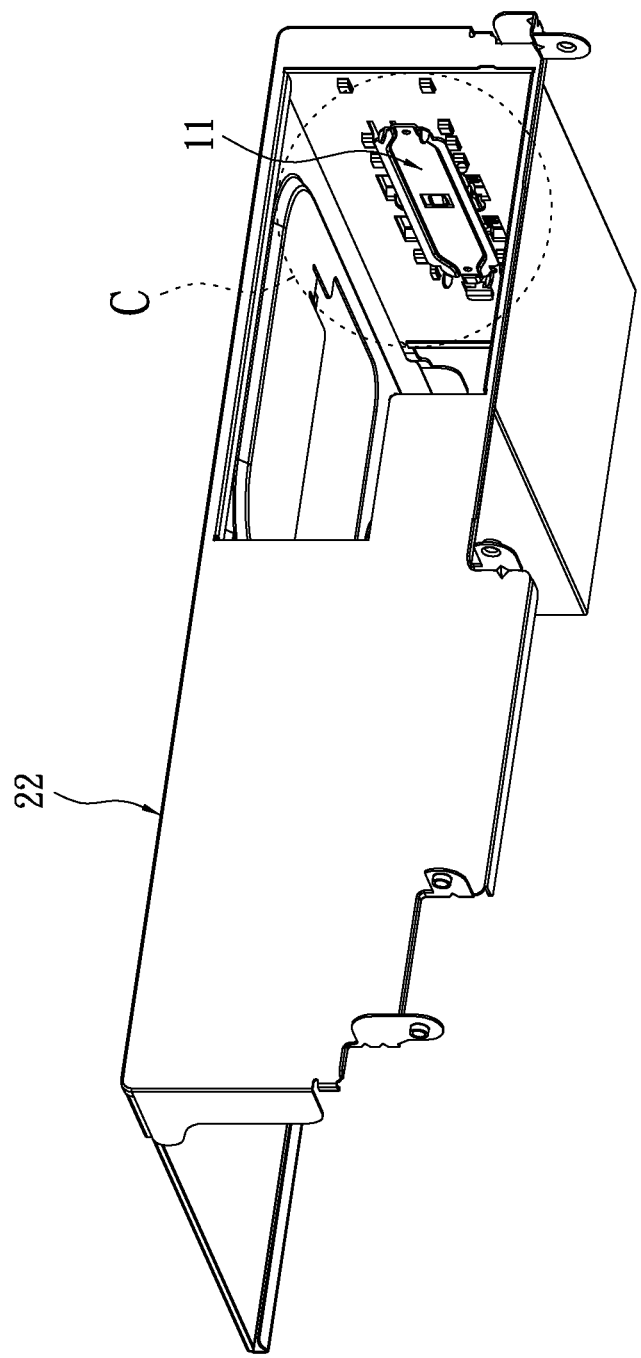
FIG. 2B is another perspective view showing that by means of the assembly unit of the instant disclosure, the optical disk driver is securely assembled in the casing, without displaying the optical disk driver.
Figure 2C:
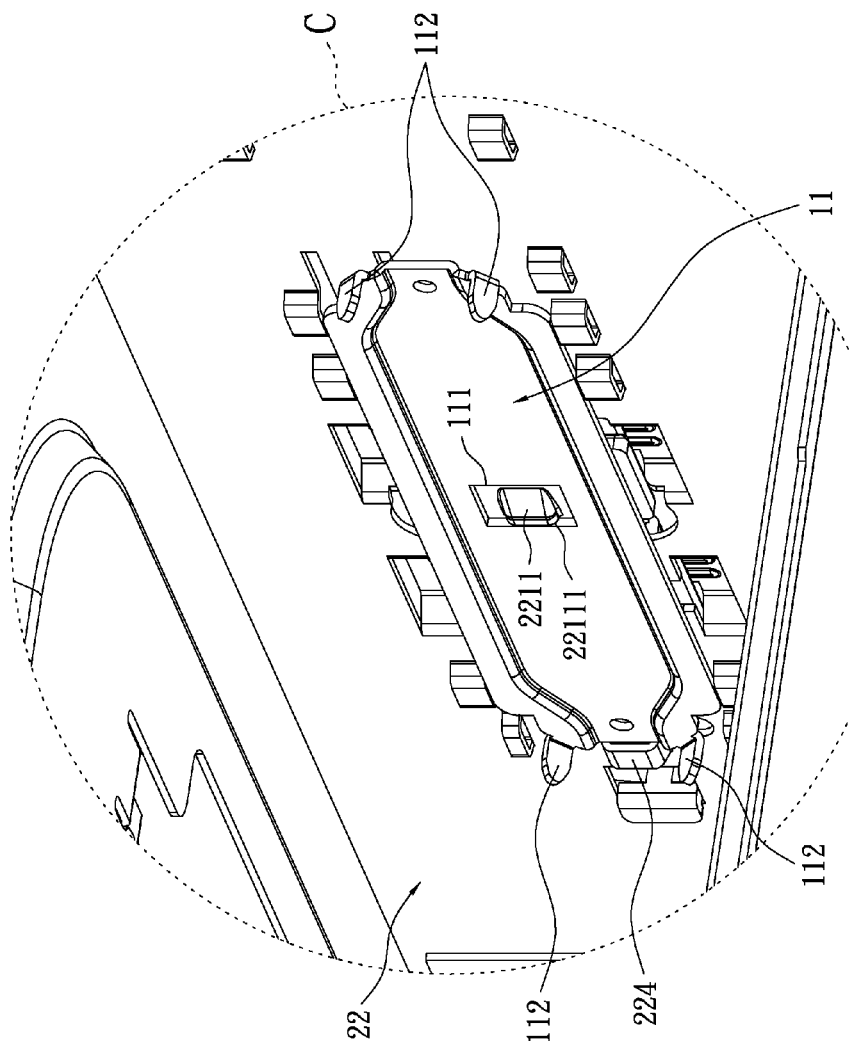
FIG. 2C shows the enlarged view of C part of FIG. 2B.
Figure 2D:
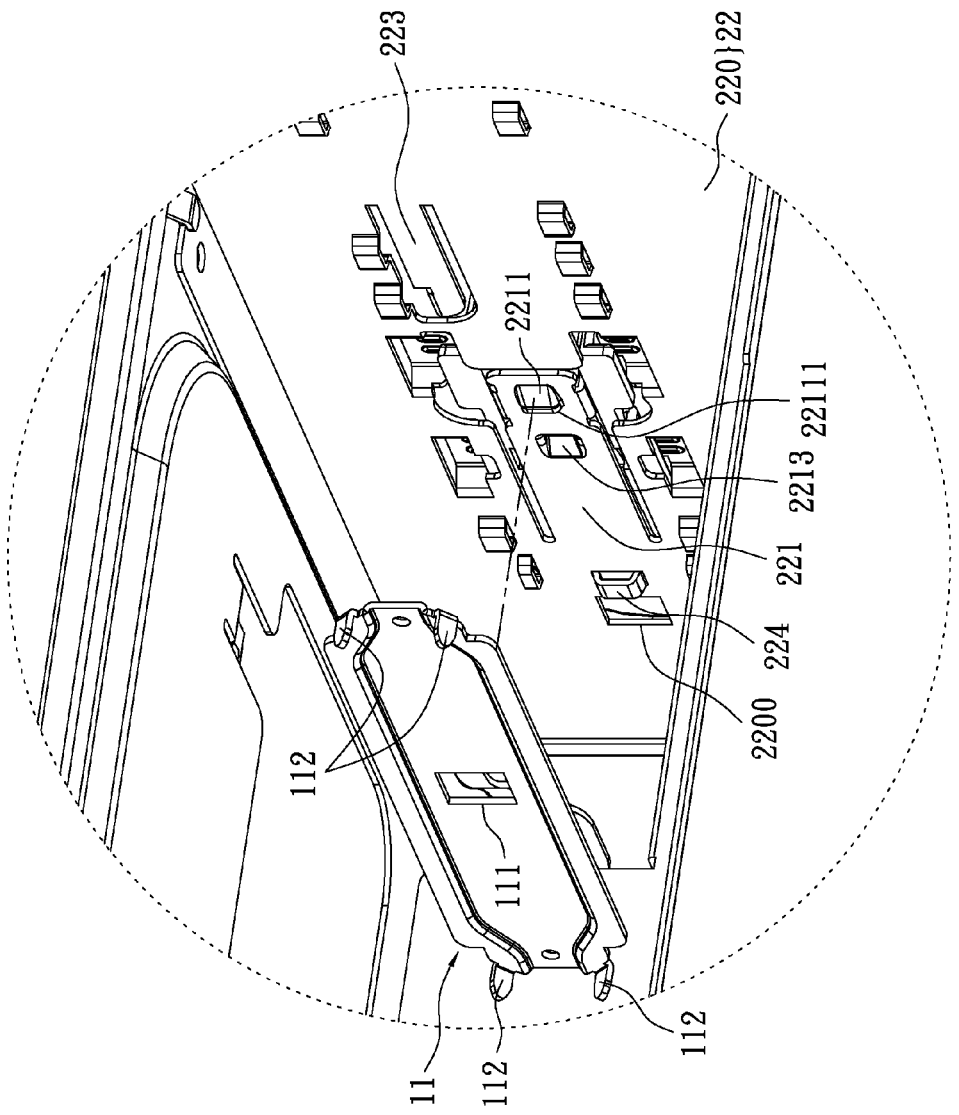
FIG. 2D shows the enlarged exploded view of C part of FIG. 2B, without the latching member.

Please refer to FIGS. 1C, 1D and 2A; the side plate 220 of the casing 22 has at least one pair of track portions 222 corresponding to the latching member 12. The latching member 12 is slidably assembled on the track portions 222 to drive the movement of the first tongue portion 221. In other words, the latching member 12 can be forced to slide along the track portions 222 and thus drive the first tongue portion 221 to have a corresponding variation in position. In detail, the latching member 12 includes a main body 121 having at least one pair of side portions 122 at two sides thereof for slidably engaged with the pair of track portions 222. As shown in FIGS. 3 and 3A, the main body 121 includes a front end 121A and a rear end 121B, and two sides of the main body 121 respectively have two side portions 122 (i.e., two pairs of the side portions 122). Similarly, the side plate 220 of the casing 22 has two pairs of track portions 222 corresponding to the side portions 122. However, the two sides of the main body 121 respectively have one side portion 122 (i.e., one pair of the side portions 122) in another alternatively embodiment. Similarly, the side plate 220 of the casing 22 has one pair of track portions 222 corresponding to the side portions 122. That means the number of the track portion 222 and the side portions 122 can be adjustable depending on the practice structure. In the exemplary embodiment, the track portion 222 can be constructed by a bent plate formed from the casing 22 to define a track. Preferably, the bent plate further has at least one convex point 2220 protruding toward the interior of the casing 22. The side portion 122 is plate-shaped and can be slidably engaged with the track portion 222 so that the plate-shaped side portion 122 can slide along the track portion 222. Moreover, the convex point 2220 contacts the side portion 122 in a point-contact manner for decreasing the friction between the side portion 122 and the track portion 222. In addition, the rear end 121B of the main body 121 of the latching member 12 further connects with an elastic member 124 and the front end 121A of the main body 121 has a pressing portion 125. In the exemplary embodiment, the elastic member 124 is integral with the rear end 121B of the main body 121. For example, the elastic member 124 can be a ring structure which is formed by bending a plastic, and two ends 1240 of the elastic member 124 are integrally formed with the rear end 121B of the main body 121. The middle portion 1241 of the plastic abuts against the casing 22 so that the elastic member 124 is spring biased to return the main body 121 to the first position. As shown in FIG. 2A, the middle portion 1241 can be a bent insertion member and the side plate 220 has a corresponding insertion hole 2200 so that the middle portion 1241 of the plastic can abut against the casing 22 by cooperation of the bent insertion member and the insertion hole 2200.

Furthermore, the first tongue portion 221 has two corresponding extending protrusions 2212. The two extending protrusions 2212 are formed on two sides of the first tongue portion 221 in pairs and preferably, the two extending protrusions 2212 are formed near to the free end of the first tongue portion 221. The main body 121 has two sliding slopes 123 corresponding to the extending protrusions 2212. In the exemplary embodiment, the slanted height of the sliding slope 123 is decreased along the insertion direction of the optical disk driver 21. Each extending protrusion 2212 has an arc-shaped surface. For example, platforms 2210 are respectively bent from two sides of the first tongue portion 221 and a convex ring structure formed on each platform 2210 is constructed as the extending protrusion 2212. Therefore, the flange of the convex ring structure (i.e., the extending protrusion 2212) can slide along the sliding slope 123.

When one pushes the optical disk driver 21 into the casing 22 for assembling the optical disk driver 21 in the casing 22, the fixing member 11 disposed on the side wall 210 of the optical disk driver 21 slightly interferes with the fixing protrusion 2211 of the first tongue portion 221 without moving the latching member 12. When the fixing protrusion 2211 exactly reaches to the fixing hole 111, the fixing protrusion 2211 is sprang into the fixing hole 111 so that the fixing protrusion 2211 engages with the fixing hole 111 of the fixing member 11 to fixedly secure the optical disk driver 21 in the casing 22. Please refer to FIG. 2C; the fixing protrusion 2211 preferably has a stopper surface 22111 for abutting against the inner wall of the fixing hole 111. Therefore, the optical disk driver 21 is more securely assembled in the casing 22.

Figure 4:
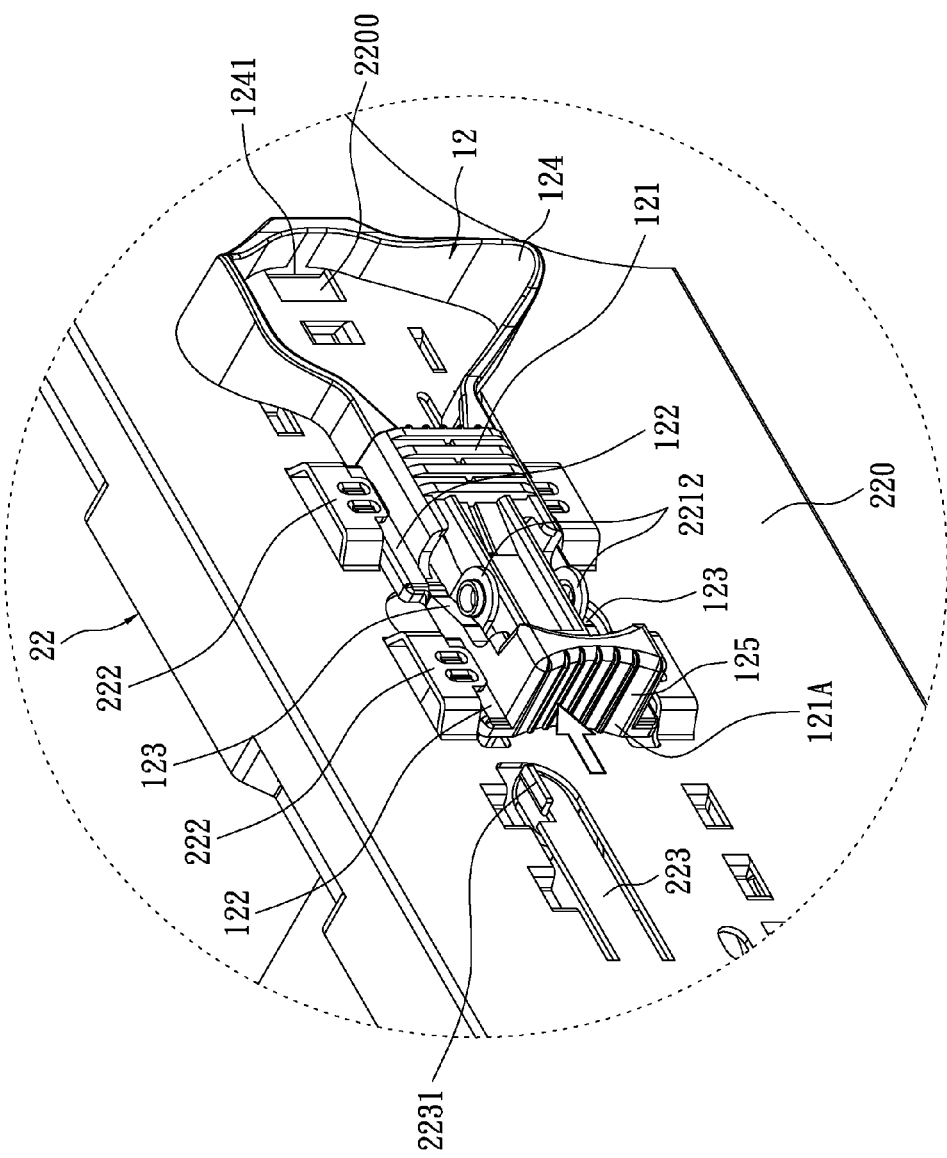
FIGS. 4 and 4A show the movement of the latching member when the latching member is forced to slide according to the instant disclosure.
Figure 4A:
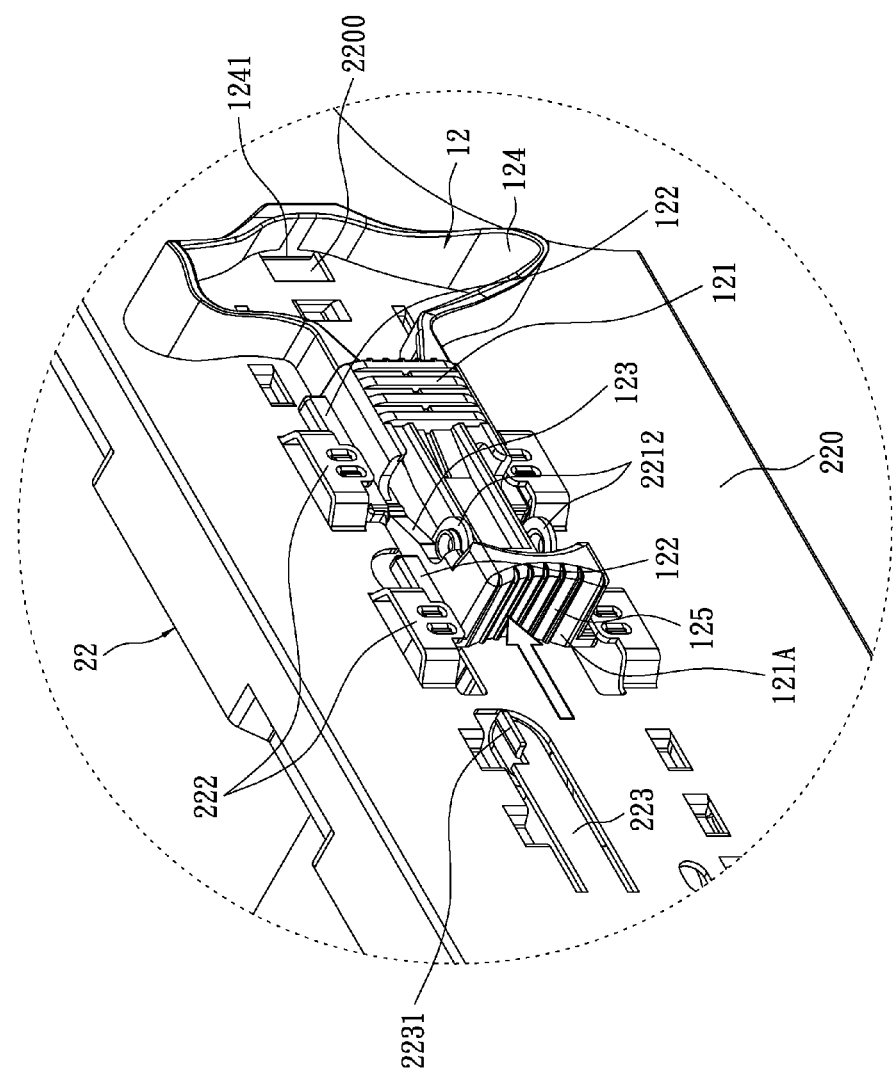
Figure 4B:
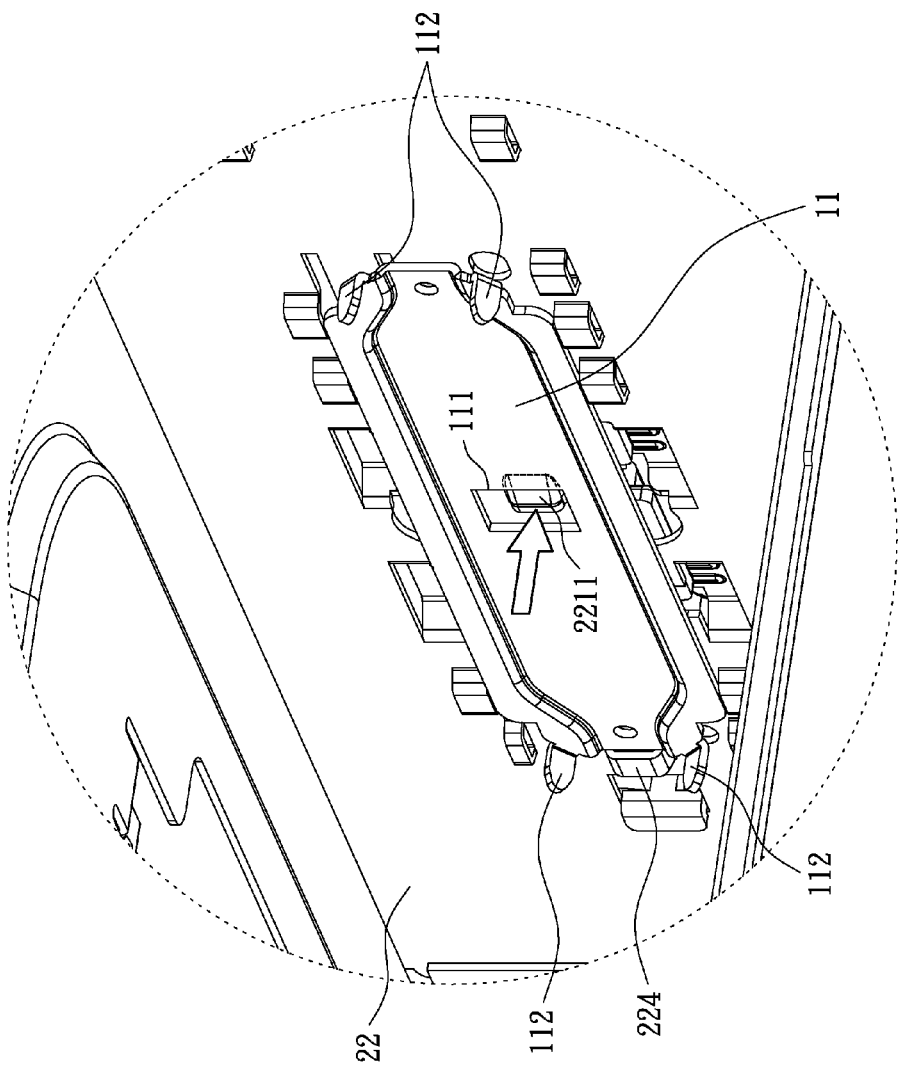
FIG. 4B shows that the fixing protrusion is disengaged with the fixing hole when the latching member slides according to the instant disclosure.

One can force on the pressing portion 125 of the latching member 12 to release and disassemble the optical disk driver 21 from the casing 22. While forcing on, the main body 121 of the latching member 12 slides in the direction as shown by the arrow of FIG. 4 (i.e., toward the rear side of the casing 22). Simultaneously, the extending protrusion 2212 of the first tongue portion 221 slides along the sliding slope 123 from the lower position (i.e., the rear end of the sliding slope 123) to the higher position (i.e., the front end of the sliding slope 123), as shown in FIGS. 4 and 4A. Therefore, the free end of the first tongue portion 221 is then lifted away from the optical disk driver 21 while the convex ring structure of the extending protrusion 2212 slides along the sliding slope 123. Meanwhile, the fixing protrusion 2211 of the first tongue portion 221, as shown in FIG. 4B, is disengaged with the fixing hole 111 of the fixing member 11. Thus, the optical disk driver 21 is released from the side plate 220 of the casing 22 and one can draw out the optical disk driver 21 from the casing 22.

On the other hand, when the main body 121 of the latching member 12 is forced to slide toward the rear side of the casing 22, the elastic member 124 is deformed due to the movement of the main body 121. As the embodiment shown in FIG. 4A, the elastic member 124 is compressed. One can first slightly draw back the optical disk driver 21 for disengaging the fixing protrusion 2211 with the fixing hole 111. Then, one can stop forcing on the pressing portion 125 and further draw the optical disk driver 21 completely out of the casing 22. Alternatively, one can directly draw the optical disk driver 21 out of the casing 22 during the pressing portion 125 is forced thereon, and then stop forcing on the pressing portion 125. After the user stops forcing on the pressing portion 125, the main body 121 returns to a first position (i.e., the original position) as shown in FIG. 2A due to the resilient force of the compressed elastic member 124. Briefly speaking, when one forces on the pressing portion 125 to slide the main body 121 for disengaging the optical disk driver 21 with the casing 22, the elastic member 124 is compressed. After drawing out the optical disk driver 21 from the casing 22, the user stops forcing on the pressing portion 125 and then the main body 121 returns to the original position due to the resilient force of the compressed elastic member 124. In another embodiment, the elastic member 124 can be any elastic members, such as springs, elastic piece and so on. On the other hand, the elastic member 124 can be disposed in any suitable position and not restricted by the above-mentioned example.

On the other hand, the main body 121 of the latching member 12 has a rib 126 on the inner side thereof as shown in FIG. 3A for substantially pushing the free end of the first tongue portion 221 back to its original position. Corresponding to the rib 126, the first tongue portion 221 has an auxiliary protrusion 2213, as shown in FIG. 1D, which forms on the outer surface of the side plate 220 of the casing 22 and protrudes toward the exterior of the casing 22. In detail, the rib 126 is formed inside the main body 121 and extends along the longitude direction defined by the front end 121A and the rear end 121B. During the main body 121 returns to the original position due to the resilient force of the elastic member 124, the rib 126 interferes with the auxiliary protrusion 2213. In detail, the rib 126 has an interfering slope 126A with increasing height from the front to the rear and an interfering top 126B extended from the interfering slope 126A. Furthermore, the interfering top 126B has a limiting concave 126C thereon. The interfering slope 126A and the interfering top 126B are formed inside the main body 121. When the main body 121 slides back to the original position from the rear to the front, the interfering slope 126A and the interfering top 126B contact the top surface of the auxiliary protrusion 2213 in sequence for pushing the free end of the first tongue portion 221 back to its original position. Moreover, the interfering slope 126A can be used to improve the sliding smoothness between the rib 126 and the auxiliary protrusion 2213. The limiting concave 126C can preferably be used for fixing the top end of the auxiliary protrusion 2213 on the rib 126. By the auxiliary protrusion 2213 and the rib 126, the first tongue portion 221 can be pushed back to its original position when the optical disk driver 21 is drawn away from the casing 22 so that the first tongue portion 221 is ready to secure another optical disk driver 21. On the other hand, when the optical disk driver 21 is assembled on the casing 22, the rib 126 interferes with the auxiliary protrusion 2213 due to the structures of the interfering slope 126A and the interfering top 126B such that the first tongue portion 221 is pressed to engage the fixing protrusion 2211 with the fixing hole 111. Briefly speaking, the rib 126 and the auxiliary protrusion 2213 can cooperate with each other to improve the assembling stability of the optical disk driver 21 within the casing 22.

Please refer to FIGS. 2A and 2C; the casing 22 has a second tongue portion 223 corresponding to the front end 121A of the main body 121. The second tongue portion 223 is substantially disposed at the front of the front end 121A such that the free end of the second tongue portion 223 can prevent the latching member 12 from escaping from the casing 22. In detail, the free end of the second tongue portion 223 can has a retarding protrusion 2231. When the optical disk driver 21 is pushed into the casing 22, the free end of the second tongue portion 223 is pressed by the side wall 210 of the optical disk driver 21 to prevent the free end of the second tongue portion 223 from indenting toward the interior of the casing 22; and the retarding protrusion 2231 can be used to block the front end 121A of the main body 121 so as to prevent the latching member 12 from sliding forward and dropping off As a result, the reliability of the assembly unit for securing the drawable device can be insured.

As shown in FIG. 1, the casing 22 has a storage portion 225. The fixing member 11 can be temporarily and detachably disposed on the storage portion 225, as shown in FIG. 1C, when the fixing member 11 is not yet used to secure the optical disk driver 21 with the casing 22. Therefore, the issue of losing the fixing member 11 can be avoided. In the exemplary embodiment, the storage portion 225 can preferably be storage slots which are formed in a whole on the top plate 226 of the casing 22. It is convenient for the user to detach the fixing member 11 to assembling the fixing member 11 on the optical disk driver 21 and then to securely assemble the optical disk driver 21 on the casing 22.

Figure 5:
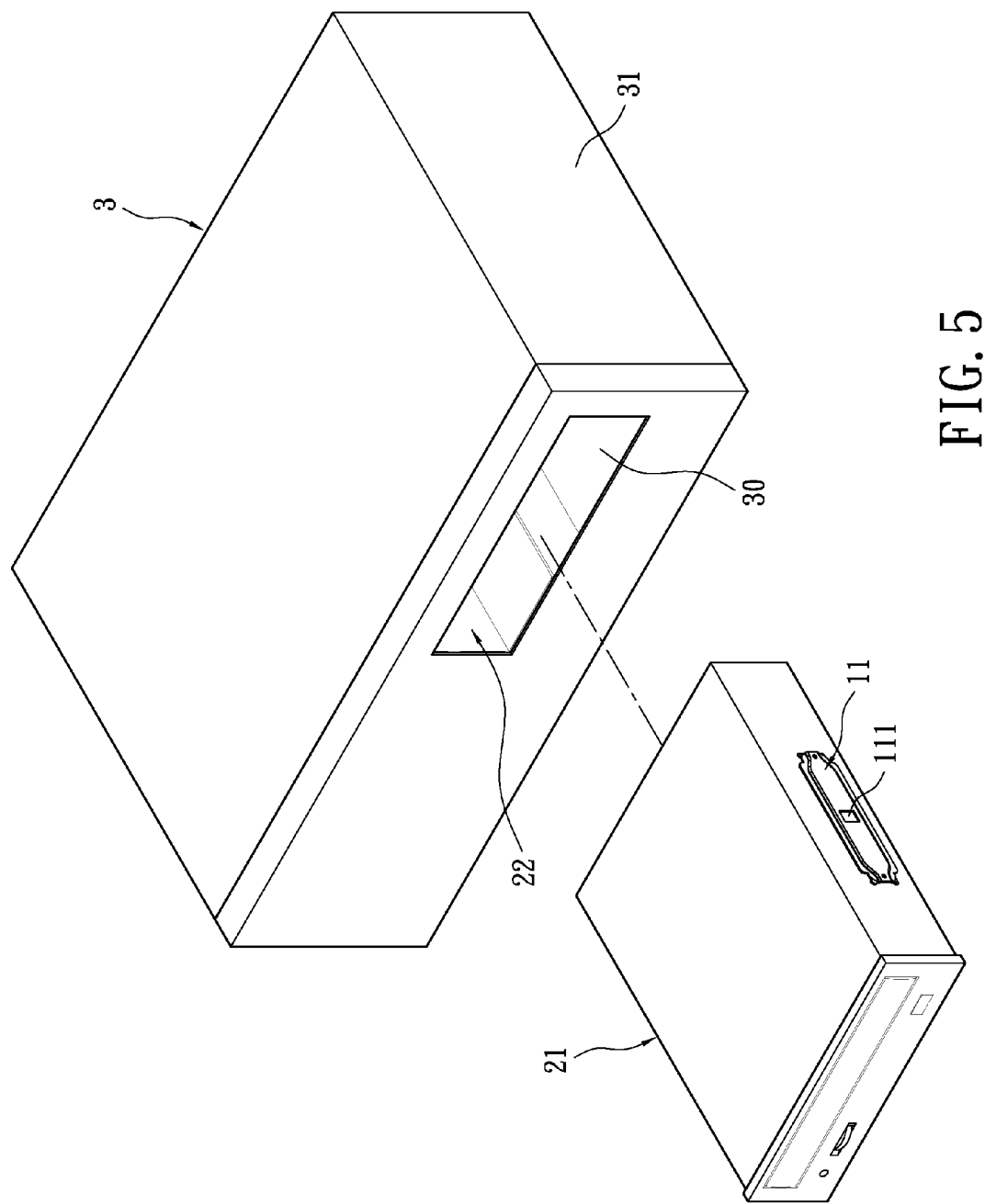
FIG. 5 shows that by means of the assembly unit of the present invention, a common optical disk driver can be securely inserted directly from the exterior into a computer casing.

To sum up, the assembly unit constructed by the fixing member 11 and the latching member 12 in the present invention can be provided for securely assembling a drawable device, such as an optical disk driver 21 to a casing, such as the casing 22 of the computer. In addition, the fixing member 11 has a thickness in a predetermined range, preferably less than or equal to 1 mm. For example, the fixing member 11 can be a metal plate. One can directly insert the optical disk driver 21 having the fixing member 11 disposed thereon into the computer housing 3 through the insertion opening 30 outside of the casing 22. As shown in FIG. 5, the computer housing 3 is constructed by the casing 22 and the cover plate 31. In other words, it is not necessary for the user to detach the cover plate 31 from the computer housing 3 to assemble the optical disk driver 21 onto the casing 22 of the computer housing 3. Moreover, the fixing member 11 can be disposed on the normal optical disk driver 21 by the inherent threaded holes of the optical disk driver 21. In other words, the assembly unit of the present invention is suitable for securing a common optical disk driver 21 into the casing 22 and it is not necessary to additionally manufacture an optical disk driver 21 and casing 22 with special size and specification. In the hereinbefore embodiment, the casing 22 is a chassis of a computer housing 3. In an alternative embodiment, the casing 22 can be a complete computer housing having the cover plate 31 and the latching 12 can be assembled on the outer plate of the computer housing in an exposed manner for achieve the assembling/disassembling the optical disk driver 21 with the casing 22.

The present invention is provided for stably assembling the optical disk driver 21 to the casing 22 and for efficiently disassembling the optical disk driver 21 from the casing 22 by means of cooperation of the fixing member 11 and the latching member 12. The movement of the latching member 12 can be mechanically used to release the secured optical disk driver 21. Therefore, the fixing member 11 disposed at a single side of the optical disk driver 21 and the corresponding latching member 12 disposed at the casing 22 can achieve securely assembling and drawably detaching the optical disk driver 21. Still further, it is no necessary to assemble/disassemble the optical disk driver 21 by screws and tools.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A casing for assembling a drawable device, the drawable device being inserted into the casing, the casing comprising:
a plurality of plates and an assembly unit;
  wherein the assembly unit comprises:
    a fixing member disposed on a side wall of the drawable device and having a fixing hole;
    a latching member slidably disposed on one of the plates corresponding to the fixing member;
  wherein a first tongue portion is formed on the one of the plates and corresponds to the latching member,
  wherein the first tongue portion has a free end and a fixing protrusion formed substantially near to the free end and protruding toward the interior of the casing; and
  wherein the fixing protrusion engages with the fixing hole when the drawable device is assembled to the casing,
  wherein said one of the plates has at least one pair of corresponding track portions, the first tongue portion has two corresponding extending protrusions, the latching member includes a main body having at least one pair of side portions for slidably engaged with the pair of track portions at two sides thereof, and the main body has two sliding slopes respectively corresponding to the two extending protrusions;
  wherein each of the extending protrusions slides along the corresponding sliding slope for lifting the first tongue portion away from the drawable device when the latching member is forced to slide, thereby the fixing protrusion disengages with the fixing hole and the drawable device can be drawn away from an insertion opening of the casing.

2. The casing as claimed in claim 1, wherein the main body further has a rib at the inner side thereof, and the first tongue portion has an auxiliary protrusion protruding toward the exterior of the casing and corresponding to the rib to interfere therewith.

3. The casing as claimed in claim 1, wherein the main body includes a front end and a rear end, the front end has a pressing portion, and the rear end connects with an elastic member substantially fixed onto said one of the plates, thereby the elastic member is spring biased to return to a first position.

4. The casing as claimed in claim 3, wherein the elastic member is formed by bending a plastic, two ends of the elastic member are integrally formed with the rear end, and the elastic member has a bent insertion arranged on a middle portion thereof, the bent insertion inserts into an insertion hole of the casing, and wherein the latching member is slidable with respect to the casing to compress the elastic member or return to the first position thereof by the resilient force of the compressed elastic member and cooperation of the bent insertion and the insertion hole of the casing.

5. The casing as claimed in claim 1, wherein the drawable device is a disk driver, the casing is a housing or chassis of a computer, or a chassis or a housing of a server, and the casing further has an insertion opening through which the drawable device is inserted.

6. The casing as claimed in claim 1, wherein the fixing member is a metal plate of a thickness less than or equal to 1 mm.

7. An assembly unit for assembling a drawable device to a casing having a plurality of plates, the assembling unit comprising:
  a fixing member disposed on a side wall of the drawable device and having a fixing hole; and
  a latching member slidably disposed on the casing and corresponding to the fixing member, wherein the latching member includes a main body comprising a rib at the inner side thereof, and the rib includes an interfering slope and an interfering top extended from the interfering slope,
  wherein a first tongue portion is formed on one of the plates and corresponds to the latching member, the first tongue portion has a free end, a fixing protrusion formed substantially near to the free end and protruding toward the interior of the casing, and an auxiliary protrusion protruding toward the exterior of the casing and corresponding to the rib to interfere therewith,
  wherein the fixing protrusion engages with the fixing hole and the interfering top of the rib is fixed on the auxiliary protrusion when the drawable device is assembled to the casing, wherein the interfering slope and the interfering top are configured to contact the auxiliary protrusion for pushing the free end back when the drawable device is drawn away from the casing, wherein the casing has at least one pair of corresponding track portions, the first tongue portion has two corresponding extending protrusions, the main body further comprises at least one pair of side portions for slidably engaged with the pair of track portions at two sides thereof, and the main body has two sliding slopes respectively corresponding to the two extending protrusions;

wherein each of the extending protrusions slides along the corresponding sliding slope for lifting the first tongue portion away from the drawable device when the latching member is forced to slide, thereby the fixing protrusion disengages with the fixing hole and the drawable device can be drawn away from the casing.

8. The assembly unit as claimed in claim 7, wherein the main body further includes a front end and a rear end, the front end has a pressing portion, and the rear end connects with an elastic member substantially fixed onto the casing, thereby the elastic member is spring biased to return the main body to a first position.

9. The assembly unit as claimed in claim 8, wherein the elastic member is formed by bending a plastic, two ends of the plastic are integrally formed with the rear end, and the middle portion of the plastic abuts against the casing.

10. The assembly unit as claimed in claim 7, wherein the side wall of the drawable device has a plurality of assembling holes, the fixing member has a plurality of assembling pillars corresponding to the assembling holes, and the assembling pillars are respectively inserted into the assembling holes so that the fixing member is detachably disposed onto the side wall.

11. The assembly unit as claimed in claim 7, wherein the drawable device is a disk driver, the casing is a housing or chassis of a computer, or a chassis or a housing of a server.

12. The assembly unit as claimed in claim 7, wherein the fixing member is a metal plate of a thickness less than or equal to 1 mm.

* * * * *